US006327910B1

(12) United States Patent
Beall

(10) Patent No.: US 6,327,910 B1
(45) Date of Patent: Dec. 11, 2001

(54) SPECIAL STICKER AND PROCEDURE FOR DETECTING ACOUSTIC EMISSION (AE) OR ULTRASONIC TRANSMISSION DURING DRYING OF LUMBER

(76) Inventor: Frank C. Beall, 3367 Brentwood Ave., El Sobrante, CA (US) 94804

( * ) Notice: Subject to any disclaimer, the term of this patent is extended or adjusted under 35 U.S.C. 154(b) by 0 days.

(21) Appl. No.: 09/339,971

(22) Filed: Jun. 25, 1999

(51) Int. Cl.[7] .................................................... G01N 29/00

(52) U.S. Cl. ................................ 73/644; 73/597; 73/598; 73/587; 73/602

(58) Field of Search .............................. 73/598, 587, 645, 73/584, 597, 599, 600, 602, 617, 632, 644

(56) References Cited

U.S. PATENT DOCUMENTS

| | | | | |
|---|---|---|---|---|
| 5,024,091 | * | 6/1991 | Pellerin et al. | 73/597 |
| 5,396,799 | * | 3/1995 | Ross et al. | 73/579 |
| 6,026,689 | * | 2/2000 | Snyder et al. | 73/602 |
| 6,029,522 | * | 2/2000 | Schafer et al. | 73/598 |
| 6,092,418 | * | 7/2000 | Schafer et al. | 73/598 |

OTHER PUBLICATIONS

Beall, F. C., J.M. Biernacki, and R. L. Lemaster. 1994. The use of acousto–ultrasonics to detect biodterioration in utility poles. Journal of Acoustic Emission, vol. 12, Numbers1/2 pp. 55–64.

Beall, F. C., M. Titta, and J. M. Biernacki. 1997, The use of acousto–ultrasonics to detect biodeterioration in structural wooden members, Proceedings, Nondestructive Testing and Evaluation of Infrastructure, vol. 2 (H. Dos Reis and B.B. Djordjevic, eds.) Topics on Nondestructive Evaluation Series. American society for Nondestructive Testing, Columbus, OH, pp. 181–206. Presented at the 1997 ASNT Spring Conference and Symposium, Houston, Texas, Mar. 17–21, 1997.

* cited by examiner

*Primary Examiner*—Hezron Williams
*Assistant Examiner*—Jacques M Saint-Surin

(57) ABSTRACT

Disclosed are an apparatus and a monitoring system and various methods for use in the drying of lumber that use disclosed apparatus. During drying lumber is arranged in multiple courses stacked one on top of the other with multiple wooden stickers substantially evenly spaced from each other between courses and extending across the full width of said stack. The present invention includes a special sticker for inclusion in place of one of the wooden stickers to monitor the AE from the stack and to ultrasonically excite the stack for other measurements. The special sticker in the simplest form, includes a body portion and an acoustic sensor with the body portion constructed of an acoustically conductive material that is sized similarly to a wooden sticker. Also disclosed is a monitoring system which includes a special sticker and signal processing and control electronics coupled to receive an AE signal from the special sticker for monitoring and controlling the drying cycle of the lumber. Additionally, an ultrasonic signal can be applied to the special sticker to excite the stack and then monitor the stack response from the special sticker. By inclusion of an acoustic sensor at both ends of a special sticker the point across the load at which the AE occurs can be determined by linear interplation of the signals received from both sensors. By applying an ultrasonic signal to a special sticker and comparing a response signal received from the special sticker, various characteristics and control features can be obtained to predict the end-point of the drying cycle, the contact integrity of the special sticker with the lumber, and the moisture content of the lumber.

54 Claims, 7 Drawing Sheets

SPECIAL STICKER AND PROCEDURE FOR DETECTING ACOUSTIC EMISSION (AE) OR ULTRASONIC TRANSMISSION DURING DRYING OF LUMBER

FIELD OF THE INVENTION

The present application relates to the use of acoustics to monitor the drying of lumber and the determination of drying endpoint, more specifically to the use of special stickers placed in the stack of lumber to be dried and the method for determining the drying endpoint of the lumber in the stack.

BACKGROUND OF THE INVENTION

The processing of logs of a selected species of tree into finished lumber requires a number of steps from the initial rough sawing of the logs to the sizing and drying of the finished lumber into uniform commercial sizes. Given the number of steps and the size of the material being processed requires that the entire process be coordinated efficiently, and that each step be completed in as short a time as possible to minimize the area at a mill that is dedicated to storage of the lumber between each of those steps, as well as prior to shipping of the finished product. Thus, ways have been sought over the years to automate and minimize the time necessary to complete each step in the production of lumber.

One of the steps that, historically, can be very time consuming and storage space extensive is the final drying process of the lumber. Depending on the thickness and species of the wood, days to months are required in the drying step. Kiln drying however has not been without problems. One of the most persistent has been, and continues to be, the ability to determine when lumber in the kiln is dry. Without a reliable process and equipment to accurately detect when the lumber is dry, lumber has traditionally been kept in the kiln longer than actually necessary. Those longer drying times in the kiln have come at a price, namely losses from overdrying and having to store a large quantity of sawn finished lumber waiting for its turn in the kiln for drying, or a more expensive solution, using more kilns. Thus, there has been ongoing research for many years for techniques and devices that more accurately determine when lumber in a kiln is dry so that it can be removed from the kiln after the shortest period of time.

In-kiln monitoring devices have been developed to provide information on two key major points during the dying process, the reduction of the core moisture content (MC) below the fiber saturation point (FSP) and the endpoint moisture content of the lumber in the kiln. The most widely used technologies (capacitance and conductance), have major drawbacks in their precision and repeatability. The capacitance method is the easiest to use, since it involves the insertion of metal electrodes through slot openings in the stack of lumber and the monitoring of changes in the capacitance to ground during the kiln drying process. Since capacitance of wood depends on grain orientation, density, wood extractives, and wood temperature, as well as to moisture content, it has inherent errors that cannot be corrected. Additionally, it is well known that wood in the drying process develops moisture gradients that distort the intended determination. The conductance method is more direct than the capacitance method in that pins are imbedded in the lumber at a number of locations and in a manner to determine core and shell moisture content. The conductance technique is limited to obtaining information from the edge of the lumber stack and is very local for each measurement point (about 25 mm between each pin). In contrast, the capacitance technique can provide "average" moisture content over the width of the stack. However, extreme moisture content values control stress development in lumber, not average moisture content values as measured by the capacitance method. Unfortunately, the resistance of wood is affected primarily by temperature, as well as some of the same variables mentioned for the capacitance. Additionally, neither the capacitance or the conductance method is accurate in measuring the fiber saturation point (FSP) in the core of pieces of lumber in the stack.

Another method that has been used for in-kiln sensing is the monitoring of the temperature drop across the load (DTL), which gives an approximation of the drying rate. This approximation is useful for an overall index of drying of softwoods (because of the high drying rate and therefore a large DTL), but cannot be used reliably for endpoint determination.

Also, many techniques have been proposed using passive acoustic emission (AE) from the lumber while drying and active ultrasonic transmission through the lumber while in the kiln. The prior art techniques for monitoring acoustic emission from the lumber have focused on the use of AE transducers to monitor development of stress in the lumber being dried which generate the acoustic emission from the lumber with AE transducers being attached directly to a board face or edge of individual pieces of lumber in the stack during drying. These techniques have demonstrated a number of distinct disadvantages.

One of those disadvantages is that those techniques each affords only very limited acquisition of AE data, on the order of only several centimeters from the transducer shoe in an individual piece of lumber in the stack. Using the prior art AE techniques to acquire sufficient data, thus requires the use of a very large array of transducers, which, if used, would be prohibitive in cost, cause time delays by the extensive set-up time required, along with installation problems with the individual transducers, the cabling requirements and the instrumentation.

A second major disadvantage is the difficulty to achieve and maintain consistent coupling between all of the transducers during set-up as well as throughout the drying process. The typical coupling material between each transducer and the piece of lumber used in prior art AE sensing is a grease-type material which is objectionable for commercial application. For rough-sawn wood, the grease over-penetrates the wood cells, and tends to lose contact pressure with the board as temperature in the kiln increases and during the drying period. Attaching the transducer with a typical hold-down damp also has proved not to be practical. Several researchers have also tried using other clamping devices which have been adequate for laboratory studies, but impractical in a commercial system because of the time, costs or special, non-standard, stacking requirements of the lumber being dried.

The only other feasible technique of attaching transducers in the prior art has been the use of an adhesive or through dry coupling. The adhesively-bonded approach has similar drawbacks to the grease couplant, such as temperature sensitivity, but also presents a major difficulty in bonding to wet material prior to the beginning of the drying process. The application and setting time of the adhesive also makes that approach wholly impractical in either the commercial or laboratory setting. Dry coupling has also proven to have two major drawbacks: loss of sensitivity of the transducer, and difficulty in applying sufficient pressure between the transducer and the lumber at all stages of the drying process to maintain suffident coupling between the transducer and the lumber. In the prior art, typical dry coupling uses elastomeric materials that can perform in a similar manner as a grease couplant in squeezing out air gaps between the transducer shoe and contacting material.

To overcome these many problems, from collecting a sufficient amount of AE data to clean and consistent coupling to the lumber during the entire drying process, requires a new approach to this on-going, persistent problem. As will be seen in the following discussion, the method and special sticker design of the present invention overcomes those problems.

SUMMARY OF THE INVENTION

The present invention discloses apparatus and various methods for use in the drying of lumber arranged in multiple courses stacked one on top of the other with multiple wooden stickers substantially evenly spaced from each other between courses and extending across the full width of said stack. Wooden stickers are well known in the art and have substantially the same vertical, horizontal and length dimensions with the length dimension being substantially the same as the full width of the stack, and the wooden stickers are installed in the stack with the same vertical-horizontal orientation as each other. One element of the present invention is a special sticker for inclusion in place of one of the wooden stickers to monitor the AE from the stack and to ultrasonically excite the stack for other measurements. The special sticker in the simplest form, includes a body portion and an acoustic sensor. The body portion is constructed of an acoustically conductive material with a cross-sectional shape that has one dimension of the cross-sectional shape that is substantially the same as the vertical dimension of a wooden sticker when installed in the stack. Typically, a wooden sticker has a rectangular cross-section with the shorter length sides being the vertically oriented sides when the wooden stickers are in the stack, thus the special sticker would have one cross-section dimension that is substantially the same as the short length side of a wooden sticker. One material that the body of the special sticker can be made of is aluminum. Additional, the body can be solid, hollow or have a cavity in at least one end.

The special sticker of the present invention also includes an acoustic sensor attached at one end of the body portion. For example, the acoustic sensor could be enclosed in a module that is affixed to one end of the body portion, wherein the length of the special sticker would be the length of the body portion plus the length of the module affixed to the end of the body portion with that combined length being substantially the same length as a wooden sticker, which is also substantially equal to the width of the stack. Alternatively, for a body portion that is either hollow or has a cavity at at least one end of the body portion, the acoustic sensor could be mounted within the end of the body portion, in which case the body portion of the special sticker is substantially the same as the length of a wooden sticker.

In an alternative embodiment of the special sticker of the present invention, there could be a second acoustic sensor attached at both ends of the special sticker either within a second module or within the hollow body or in a cavity at the second end of the body portion. Thus, for the special sticker with an acoustic sensor module at both ends of the body portion, the length of that special sticker is a combination of the length of the body portion plus the lengths of each of the modules on the ends. For the hollow or cavity defining special stickers with acoustic sensors at both ends, the length of the special sticker is also the length of the body portion, as in the single sensor embodiments.

The present invention also includes a monitoring system which includes a special sticker, of any of the various implementations, for inclusion in place of one of the wooden stickers in the stack of lumber extending the full width of the stack and in contact with substantially all boards within the courses above and below the special sticker, and signal processing and control electronics coupled to receive an AE signal from an acoustic transducer of the acoustic monitor for monitoring and controlling the drying of the lumber within the kiln. Additionally, an ultrasonic signal can be applied to the transducer to excite the stack of lumber and then monitor the transducer for the response from the stack.

Another application of the present invention is the inclusion of a special sticker that has an acoustic sensor at both ends in the stack, and then, using the signal processing and control electronics to receive first and second AE signals from the first and second acoustic sensors to determine the point across the stack each acoustic emission occurs by linear interpolation.

Also, in some embodiments, two special stickers are used in the same stack by inserting the second special sticker in vertical alignment with the first special sticker and in contact with substantially all boards within one of the courses above or below the first special sticker. With this configuration of the monitoring system, the signal processing and control electronics can be used to receive an AE signal from the acoustic transducer in the first special sticker, or to generate and apply an acousto-ultrasonic signal to the acoustic transducer of the first special sticker and to receive a corresponding acousto-ultrasonic signal from the acoustic transducer of the second special sticker for monitoring and controlling the drying of the lumber within the kiln.

The monitoring system of the present invention, using the special sticker, also can generate an acoustic emission versus time response curve for the stack throughout the drying cycle. Additionally, the present invention includes a method, using a special sticker, to determine the end point of the drying cycle for a species of wood by first predetermining a typical AE versus time response curve and related moisture content at corresponding points on the AE curve for the species of wood to be dried. It is well known that such AE curves, for all species of wood, have a similar shape that has a first period where the number of AE detections initially increases at a substantially steady rate as the lumber is dried with the number of acoustic emission increasing to a peak value, then in a second period the number of acoustic emission gradually decreases to a third period that is an end quiescent tailing off period. During the drying cyde, the special sticker is used to monitor the AE from the stack with the monitored AE curve compared to the typical acoustic emission versus time response curve for the species being dried. An offset is then determined from that comparison with the drying end-point being calculated by interpolation using the offset with the end-point of the typical acoustic emission versus time response curve.

Another method of the present invention is one were the degrade of the lumber, as well as the drying process is controlled. This is accomplished by monitoring the AE versus time response curve for an acoustic emission rate during the first period of the typically shaped AE curve and controlling the drying environment during that first period to limit the acoustic emission rate to obtain a desired maximum degrade of the finished lumber. Then, after the occurrence of the peak of the AE curve at the end of the first period the drying environment can be arbitrarily controlled during the second and third periods since amount of degrade of the finished lumber results from the speed of drying during the first period of the AE curve.

The present invention also includes a pulse-echo technique to determine the moisture content, contact continuity of the special sticker to the lumber, and to determine the drying end-point. This is accomplished by applying an ultrasonic pulse to the acoustic sensor to ultrasonically excite the special sticker and then detecting an ultrasonic response from the special sticker by the acoustic sensor which generates an electrical signal corresponding to that ultrasonic response. A time delay between the application of the ultrasonic signal and the receipt of the ultrasonic response is determined from which the sound velocity through the lumber is derived. Additionally, the applied ultrasonic signal is compared with the received ultrasonic signal. From those results an end time for the drying cycle, moisture content of the lumber or contact integrity between the special sticker and the lumber can be determined using a combination of sound velocity, time centroid and frequency centroid.

With two stickers, both the passive AE curve determination can be made by monitoring one sticker, and by applying an ultrasonic signal to one sticker and monitoring the second sticker for the response, the moisture content, contact integrity and end-point of the drying cycle can be determined in the same way as with the use of a single special sticker in the same.

DETAILED DESCRIPTION OF THE INVENTION

Figure 1:
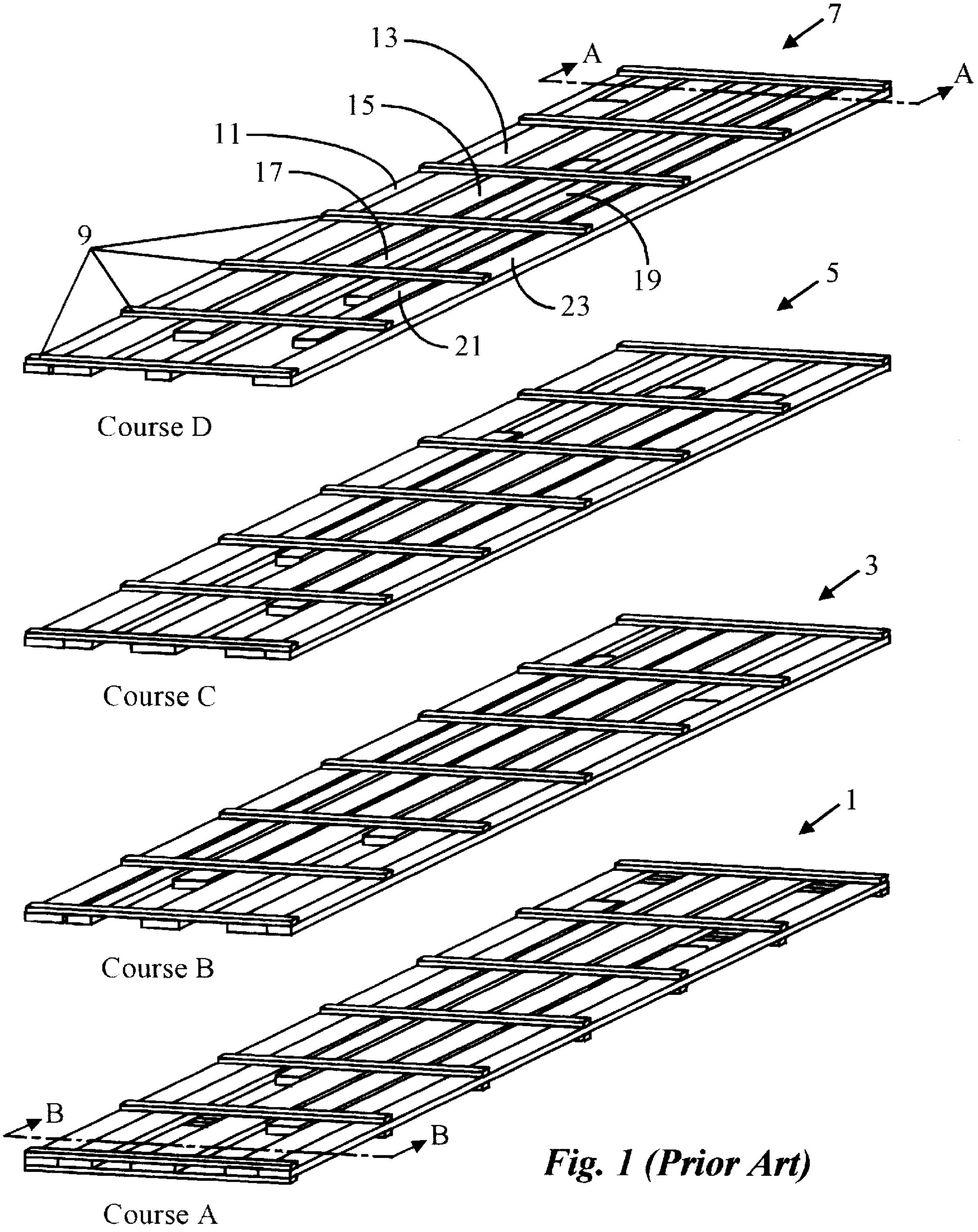
Fig. 1 (Prior Art)
FIG. 1 is a simplified, exploded, perspective view of a stack of lumber as configured for drying of the prior art.

FIG. 1 is an exploded, simplified perspective view of a prior art stack of lumber configured for drying in a kiln. Shown here are courses 1, 3, 5 and 7, each having the width of seven boards 11, 13, 15, 17, 19, 21 and 23 laid substantially side by side with at least the two outermost boards (e.g., 11 and 23 in course 7) running the full length of the course. Above and below each course are a number of wooden stickers 9 placed at each end of each course, and at substantially uniform spacing between each other, intermediate the end stickers on both the top and bottom of each course. Between adjacent courses there is a single set of stickers being shared on the bottom of the upper course and on the top of the lower course. Each set of stickers between the courses are substantially parallel to each other. Wooden stickers 9 are used to separate the courses in the stack to provide slots for air flow between the courses to permit drying air to reach both sides of the lumber in each course. Typically, stickers 9 are placed at 600 mm intervals and have cross-sectional dimensions of about 20 mm thick and 30 mm wide, and as long as the stack is wide (typically 1.2 m or 2.4 m). With stickers 9 having those dimensions, they are more than wide enough to handle the load of the lumber in the courses, even at the bottom of the stack, yet not overly wide so as to mask a large surface area of the individual boards along the length of the courses.

Figure 1A:
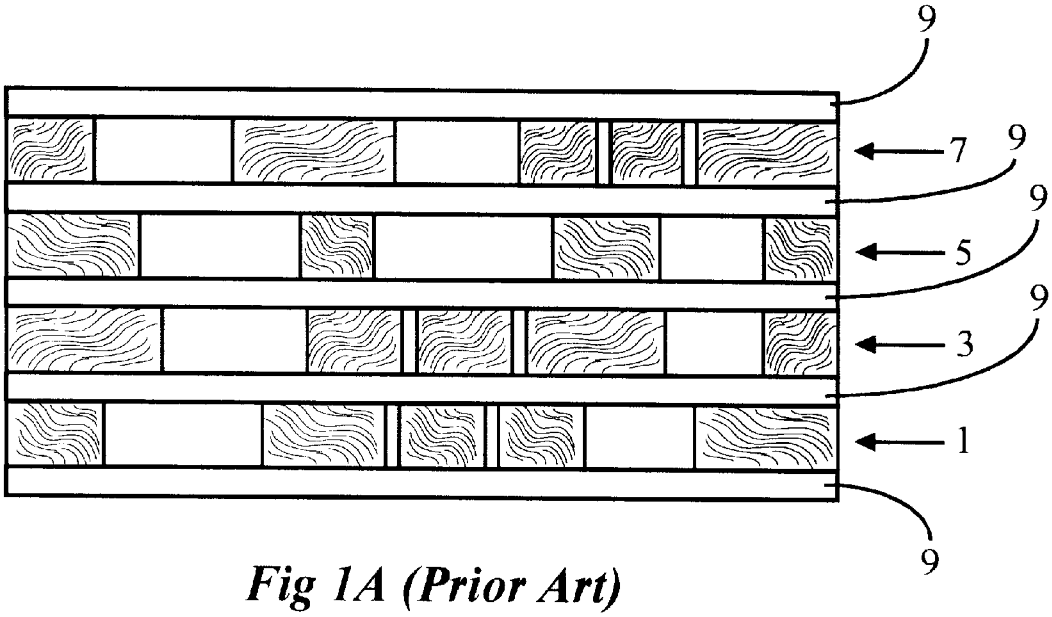
Fig 1A (Prior Art)
FIG. 1A is a vertical plan view of each of the courses of the stack of FIG. 1, one on top of the other, taken along line A—A in FIG. 1.
Figure 1B:
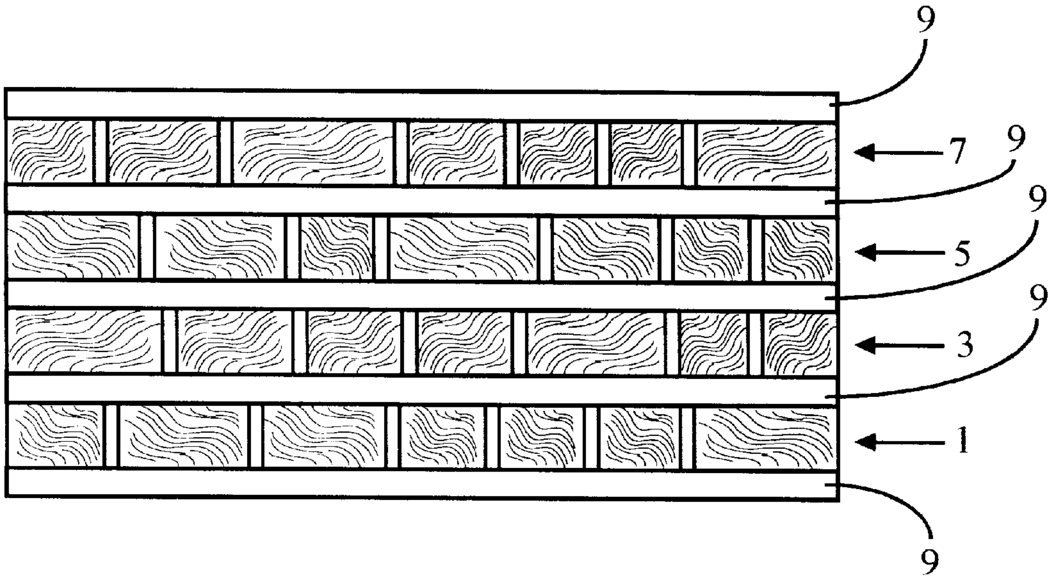
FIG. 1B is a vertical plan view of each of the courses of the stack of FIG. 1, one on top of the other, taken along line B—B in FIG. 1.

Also shown in FIG. 1 are cross-section arrows A—A at the far end of the top course 7, and cross-section arrows B—B at the near end of bottom course 1. FIG. 1A shows the cross-section A—A from FIG. 1 for all four courses shown in FIG. 1. From this view it can be seen that not all of the boards in each course extend to the far end. FIG. 1B shows the cross-section B—B from FIG. 1 for all four courses shown in FIG. 1. From this view the adjacent boards in each course can be seen, including those boards that do not extend to the near end of the stack since the cross-section is looking toward substantially the full length of the courses, as opposed to cross-section A—A which is toward the far end substantially away from the full length of the courses.

While in FIG. 1 each course is shown as including boards of different widths and lengths, that configuration is typically only used for hardwoods since lengths and widths of hardwoods often vary. That arrangement in courses is typically called "box piling". It is, however, necessary that all boards in all courses in the same stack be of the same or similar drying species and thickness. Generally, when softwoods are dried, each piece of lumber in each of the courses in the stack will be cut to the same length and width.

Figure 2:
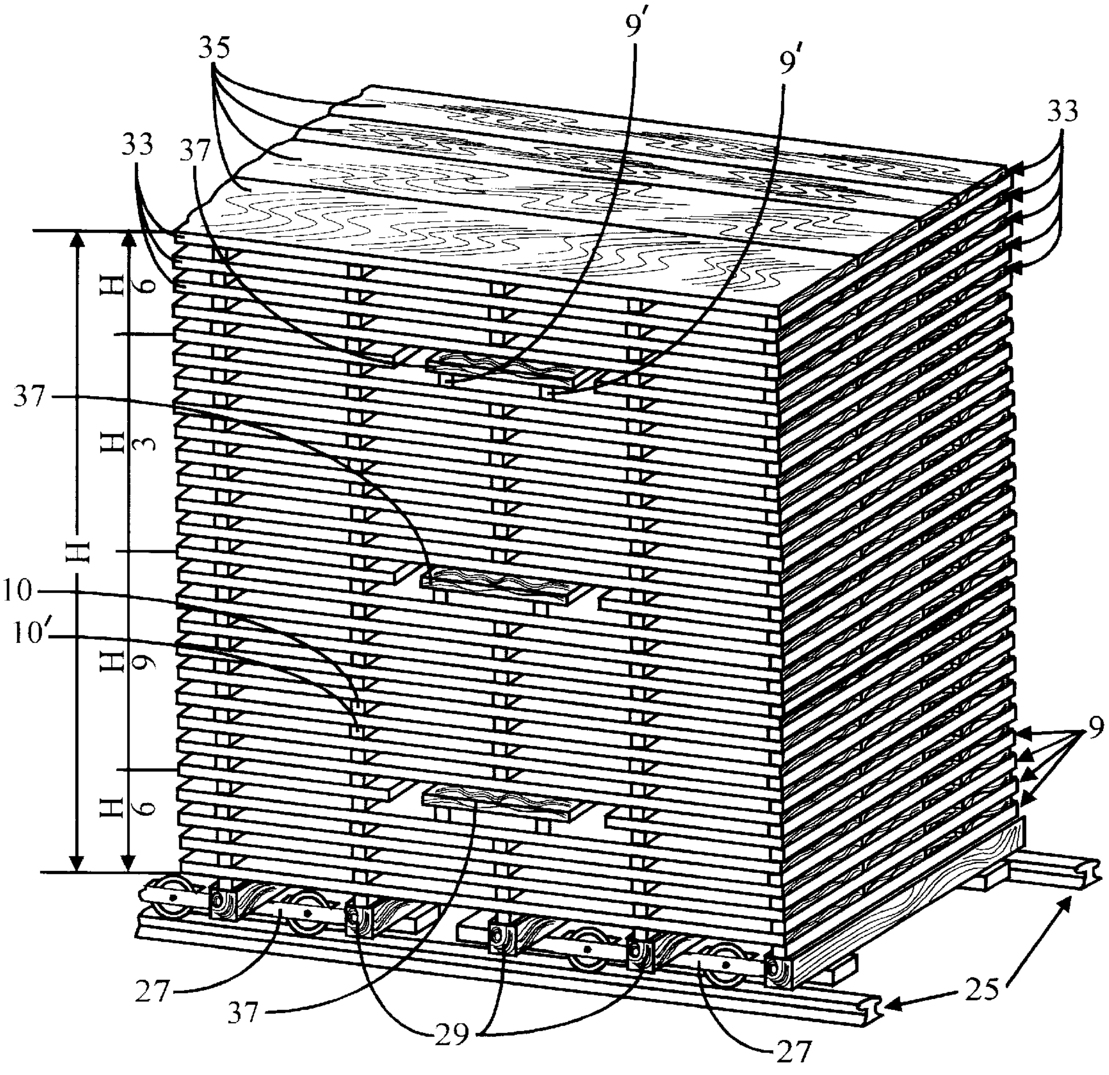
Fig. 2 (prior Art)
FIG. 2 is a perspective view of a stack of lumber for placement in a kiln for drying as in the prior art.

FIG. 2 is more representative of a typical stack of lumber that is dried in a kiln. As shown, there are twenty six courses 33 with stickers 9 between each course. To facilitate movement of the stack into, and out of, the kiln, it is shown mounted on two rail trucks 27 with bunkers 29 between each of rail trucks 27 and the bottom course of lumber. Rail trucks 27 in turn are mounted on rails 25 which may run through the lumber yard from the point where the lumber is first stacked in courses on rail trucks 27, to the pre-drying staging area, then into the kiln, and then out of the kiln to a dried lumber storage area where the lumber is stored either on rail trucks 27, or off-loaded to storage bays or directly on to motor trucks to be hauled to another location. The exact configuration of the stack or the mode of movement of the stack into and out of the kiln is introduced here for orientation and is not limiting on the present invention in any way.

Also shown in FIG. 2 are three sample boards 37 located between shorten sections of courses and mounted on stickers 9' in the vertical center of the stack, and one-third the total height of the stack above and below the center sample board 37. Sample boards 37 are provided in the prior art to permit monitoring of the drying process in the kiln.

The ideal technology would measure two variables: the state of stress during much of the drying process and the endpoint moisture content (MC). Drying schedules for kilns have been developed to allow adjustment of the drying rate in response to stress development that is largely MC-related. Since moisture content is a more determinable variable, the drying schedules have been written with MC as the controlling variable. Actually, moisture gradient, along with other wood variables and temperature, determine the stress development within the wood, so the drying schedules have been written to be conservative. Another factor is the variation in the drying schedule that occurs under actual drying conditions. The majority of kilns use steam heating to control dry bulb temperature and venting and/or steam injection to control the wet bulb temperature thereby controlling relative humidity (RH) within the kiln. An upset in the steam delivery or quality of steam (which is frequent), disrupts the regular stress development pattern of the wood, so that the stress-MC relationship is changed. Other variables within the kiln such as uneven steam flow and air circulation cause substantial local or global variations of the temperature within the kiln.

The present invention, as stated above, provides a device and method to gather more passive AE data from the lumber in the stack to monitor the rate of drying during the drying process and to more precisely determine the drying endpoint.

Figure 3A:
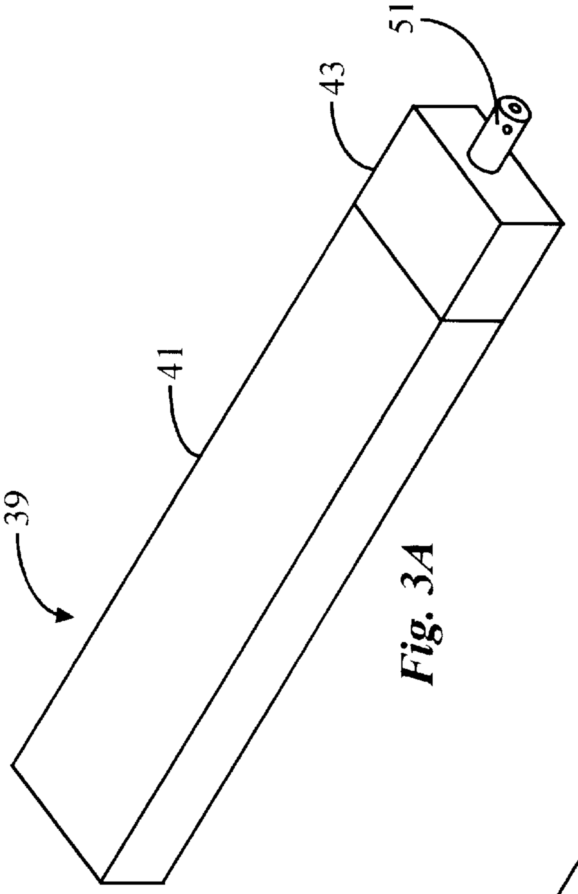
FIG. 3A is a perspective view of a first special sticker of the present invention with an external AE transducer assembly affixed to one end of the special sticker.
Figure 3B:
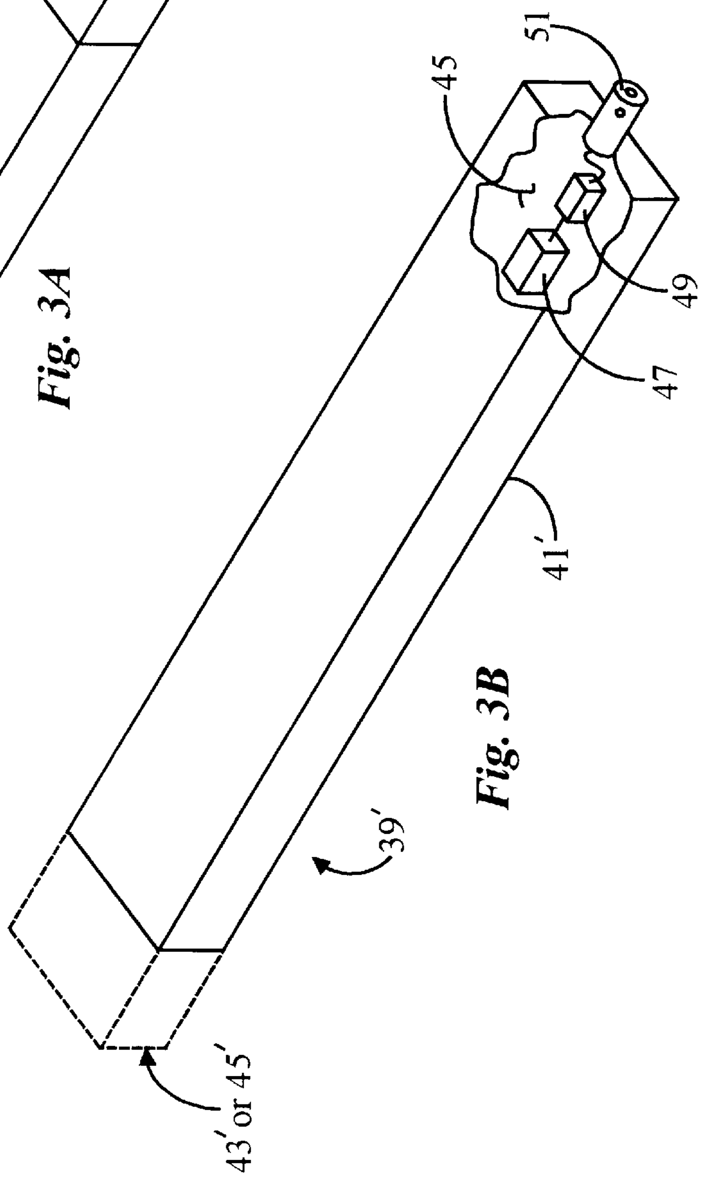
FIG. 3B is a perspective view of a second special sticker of the present invention with a cavity formed in one end to house an AE transducer assembly.

FIGS. 3A and 3B illustrate two variations of special sticker 39 of the present invention. In FIG. 3A, the first embodiment of special sticker 39 includes a solid or hollow body 41 (preferably metal, e.g., aluminum) and a housing 43 attached to one end of body 41, with the combination of body 41 and housing 43 sized to have substantially the same length, width and height as a wooden sticker 9. As will be seen below, housing 43 includes, and has hermetically sealed therein, a piezoelectric transducer 47 that is physically mounted on the end, or inner surface, of body 41 and an optional preamplifier/filter 49 (see FIG. 3C) serially coupled between transducer 47 and connector 51.

FIG. 3B illustrates a second embodiment of special sticker 39' that includes a body 41' that is either hollow or solid over the majority of its length (preferably metal, e.g., aluminum) that is longer than body 41 of FIG. 3A and sized to be the same width and height and length as wooden sticker 9. Body 41' is longer than body 41 (FIG. 3A) since a cavity 45 is provided within one end of body 41' to house a piezoelectric transducer 47 that is physically mounted to a surface within cavity 45 at the end of body 41' and an optional preamplifier/filter 49 hermetically sealed therein and serially coupled between transducer 47 and connector 51.

FIG. 3B also illustrates the inclusion of a second optional housing 43' or cavity 45' at the far end of the special sticker which also includes a piezoelectric transducer, and optional preamplifier/filter and connector as at the near end of special sticker 39'. In this configuration, the special sticker assembly is the same length as a traditional sticker 9. The operation and function of this extended, two transducer special sticker is discussed further below.

Figure 3C:
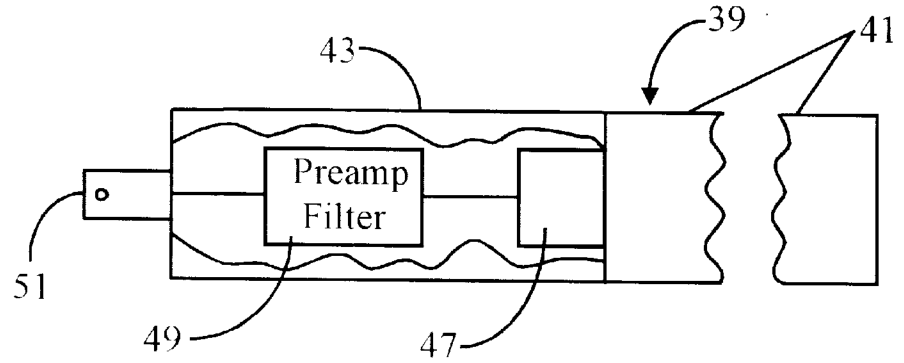
FIG. 3C illustrates a plan side view of either special sticker of the present invention to illustrate the AE transducer components affixed to the special sticker.

FIG. 3C illustrates the attachment of housing 43 to one end of body 41 of special sticker 39, and the location of piezoelectric transducer 47 physically mounted on the end of metal body 41 with optional preamplifier/filter 49 serially coupled between transducer 47 and connector 51. Thus, special stickers 39 and 39' are each typically 20 mm in thickness, 30 mm in width, and approximately the width of the stack (typically 1.2 or 2.4 m).

In one embodiment, a passive mode of operation is used to monitor the internal acoustic emission (AE) of the lumber in a stack during drying is monitored with a single special sticker 39 or 39' substituted for one of wooden stickers 9 in the stack. While any of wooden stickers 9 could be replaced with one of special stickers 39 or 39', the optimal location of the special sticker would be near the bottom of the stack to improve and maintain acoustical coupling between the special sticker and the lumber in the courses above and below the special sticker throughout the drying cycle. The special sticker could be inserted during stacking or in the kiln, using a manual "lifting bar", which was developed for inserting wooden stickers into a stack where a sticker is missing for whatever reason.

So placed, special sticker 39, or 39', in a typical stack that is 1.2-m wide with each course having eight 2×6 boards across, is in contact with at total of 16 boards across the stack (i.e., eight boards in the course above and eight boards in the course below) and acts as an accumulator, or waveguide, of acoustic emission from all of the boards in the two courses with which it has contact (i.e., in the above example, the 16 boards of the two courses) during the drying process. Because of this multiple board contact, special sticker 39, or 39', detects a greater number of AE events from the stack than with prior art monitoring techniques afixed to only one board, and is therefore much more reflective of the response of the boards in the stack. Stated differently, in the prior art AE techniques the transducers can only detect AE events within the one board to which the transducer is attached no more than several centimeters from the transducer attachment point. Whereas, the special sticker of the present invention, being made of a more acoustically-conductive material than wood, e.g. a solid metal, operates as a waveguide thus providing AE event signals to the transducer from multiple boards and from further away, i.e., from the far side of the 1.2–2.4 m wide stack. The present invention also provides a very stable attachment configuration with no effect on the airflow through the slots between the courses in the stack.

In such a configuration, special sticker 39, or 39', acts as a waveguide delivering the received acoustical emission from each of the boards that it is in contact with to piezoelectric transducer 47, and piezoelectric transducer 47 has a frequency response sufficient to detect the acoustical emission (e.g., up to 200 kHz). When the stack is placed in the kiln, an appropriate cable would be connected between the sticker and the monitoring electronics outside the kiln (discussed below with respect to FIG. 4). For those situations where the temperature in the kiln is higher than the highest temperature that the electronic elements in the special sticker are designed to operate at (e.g., up to about 100° C.), the embedded electronics could be cooled to protect the circuitry elements. To provide that cooling, the electronic elements could be placed on a metal plate of a solid state cooling system that uses the "Peltier effect" which results when a current flows through a junction of dissimilar metals.

Given the environment within the kiln and the species and condition (e.g., roughness) of wood being dried, a coating may infrequently be necessary on the special sticker in some situations to maintain coupling with the adjacent boards. If necessary an elastomer could be used to perform that function.

Figure 4A:
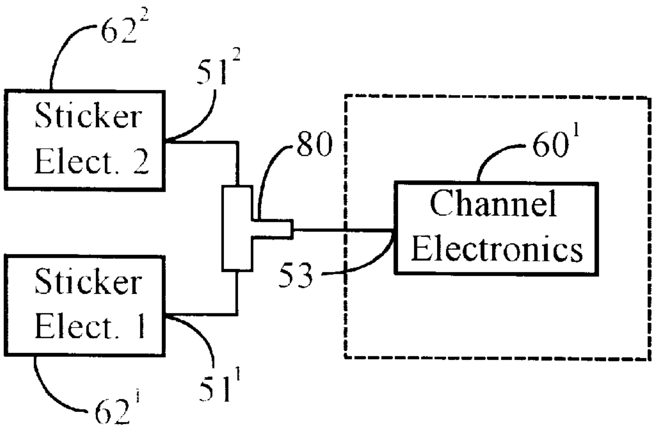
FIG. 4A is a simplified block diagram of that of FIG. 4 to illustrate the connection of more than one AE transducer to the same channel electronics of the overall electronic system.
Figure 4B:
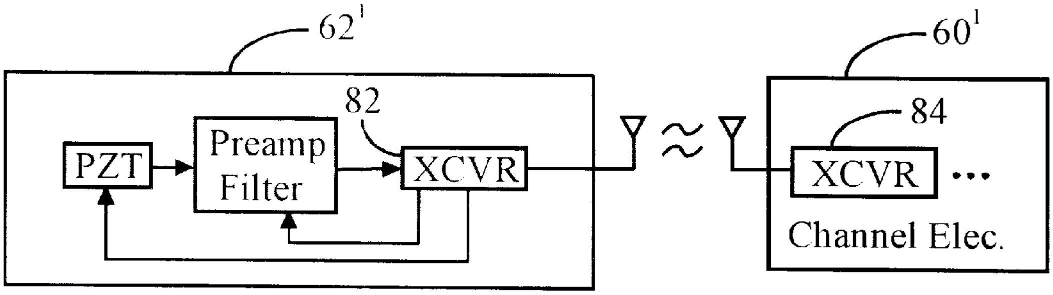
FIG. 4B is a simplified block diagram of that of FIG. 4 to illustrate the use of an rf link between the AE transducer subsystems and the corresponding channel electronics of the overall electronic system in lieu of the cable used in FIG. 4.
Figure 4:
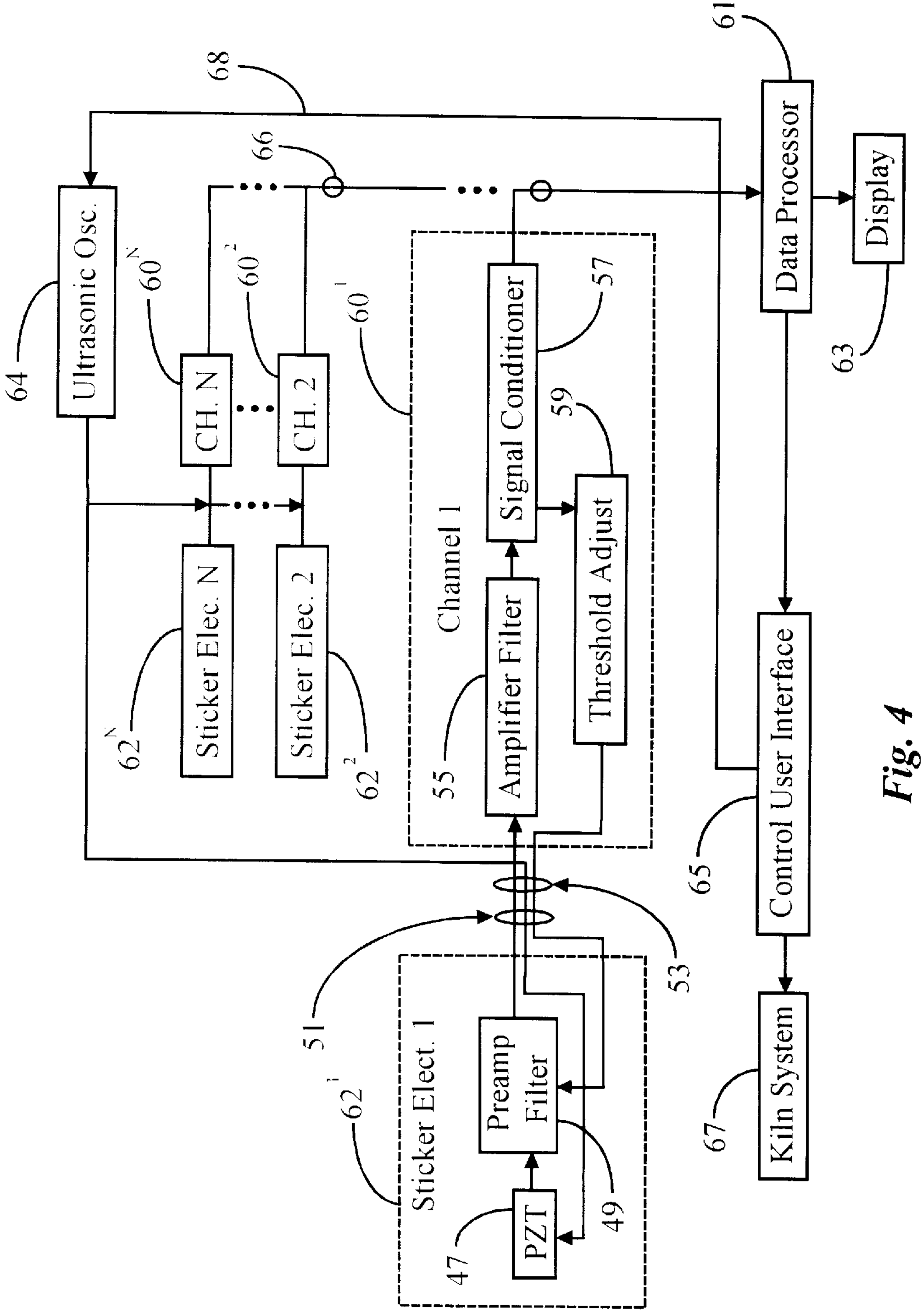
FIG. 4 is a block diagram of the overall, multi-channel, support electronic system for use of one or more special stickers in a kiln.

FIG. 4 includes a block diagram of a multi-channel AE/acousto-ultrasonic monitoring subsystem and its interface with the control system of the kiln. The AE monitoring subsystem includes multiple channels for situations where there would be multiple stacks being dried, and thus multiple special stickers being used in the kiln at the same time. In FIG. 4 the details of one AE channel $\mathbf{60}^1$ are shown since the electronics are the same for each channel, thus the monitoring subsystems for channels $\mathbf{60}^2$–$\mathbf{60}^N$ are shown only as blocks labeled $\mathbf{60}^2$ and $\mathbf{60}^N$ with three dots between them indicating others as may be necessary between them. Each one of AE monitoring subsystems $\mathbf{60}^X$ is coupled to a sensor $\mathbf{62}^x$ that contains one preamplifier/filter 49 and, in turn, a piezoelectric transducer 47 coupled to the body of a special sticker 39. Thus, if four special stickers 39 are used in the kiln, then four data channels will be necessary; if each special sticker in that configuration has a piezoelectric transducer at each end, then four additional channels for data processing will be necessary.

Thus, looking only at channel 1 for purposes of discussion, piezoelectric transducer 47 captures acoustical emission detected by the body of special sticker 39, generates a corresponding signal representative of each AE event as they are detected, with that overall signal being applied to preamplifier/filter 49 to amplify and remove noise from the overall AE signal before being coupled to connector 51. From connector 51 to a lotion outside of the kiln, an appropriate cable 53 that can withstand the environment with the kiln provides the signal to the remainder of the AE detection and processing system outside the kiln. Cable 53 outside of the kiln provides the AE signal to amplifier/filter 55 to further amplify the signal and reduce ambient noise. From amplifier/filter 55 the signal proceeds to signal conditioner 57 with the conditioned signal being applied to threshold adjustment circuit 59 to adjust the voltage baseline of preamplifier/filter 49 via cable 53 and connector 51. Additionally, the conditioned signal from each signal conditioner in each channel is applied to data processor 61 (e.g., a PC or microprocessor based subsystem) to generate an AE response such as in FIG. 5 that is presented to the operator on display 63 for each channel with the plot of the AE responses continually refreshed for the duration of the drying process. Data processor 61 is also coupled to control/user interface 65 to provide data (rate of change of moisture content, moisture content level, region of the expected AE the drying cycle is in, etc.) for making variations in the temperature, humidity, and other controls of kiln 67, automatically or with the assistance of an operator, in response to the signals received from each data channel.

Signal conditioner 57 basically modifies the signal in various ways to better permit the extraction of the AE parameters, such as peak amplitude and event duration, among others, from the received and filtered AE signal from amplifier/filter 55. Since the AE parameters may vary during the drying process, signal conditioner 57, accordingly, will need to make changes in the AE signal to continue to provide complimentary event information (e.g., event rate measurements) to data processor 61. Signal conditioner 57 also controls threshold adjust circuit 59 to vary the threshold of operation of preamp/filter 49 to achieve an acceptable signal to noise ratio. Signal conditioner 57 additionally controls the amplifier gain to keep the AE signal from preamp/filter 49 within an acceptable range so that the AE signal from preamp/filter 49 is not distorted or clipped. This is a technique that is well known by those in the art of signal control, particularly with varying environmental conditions such as in a kiln.

For the acousto-ultrasonic active operational mode of the present invention discussed below, an ultrasonic oscillator 64 has also been included for selectively activating various ones of the piezoelectric transducers 47 to apply an ultrasonic vibration to the corresponding special sticker. The received ultrasonic signals transmitted through the lumber in the stack (see discussion below) and detected by selected piezoelectric transducers 47 in selected special stickers are then processed by the corresponding channel electronics described above. That data is then processed to determine, for example moisture content of the lumber.

In some situations, perhaps where there is a high noise level, or with materials that have a low AE response, or where it is desired that more special stickers and associated AE sensors be used than there are available processing channels in the AE/acousto-ultrasonic monitoring subsystem installed in the particular kiln, more than one AE sensor on/in one, or more, special stickers can be connected to the same channel electronics. For example, one of more tee connectors can be used to connect multiple AE sensors to the same cable within the kiln. By doing so, the resultant AE events signal reaching the channel electronics is automatically a sum of all of the AE events detected by each of the AE sensors connected to the tee to the same cable. FIG. 4A is an abbreviated block diagram similar to the diagram of FIG. 4. In FIG. 4A there are sticker electronics 1 ($\mathbf{62}^1$) and sticker electronics 2 ($\mathbf{62}^2$) connected to two of the three terminals of tee connector 80, with the third terminal of tee connector 80 connected to channel 1 electronics $\mathbf{60}^1$. This would represent a significant savings in the electronics needs for monitoring the drying process within the kiln. This sharing of resources would make it possible to use multiple special stickers in each stack, or to use a single electronics channel to monitor the AE events from several stacks since all of the lumber being dried within the kiln has the same characteristics and drying schedule needs.

Additionally, as shown in FIG. 4B, it is possible to replace the connecting cable between the sensor electronics on/in each special sticker and the corresponding channel electronics with an rf link. This can be accomplished by including a first low power rf transceiver and antenna 82 in place of connector 51 in sensor $\mathbf{62}^1$ and a second low power rf transceiver and antenna 84 in place of connector 53 in channel electronics $\mathbf{60}^1$. In such a configuration rf transceivers 82 and 84 are paired to operate at the same frequency as each other, and at a different frequency than that for each other rf transceiver pair.

The passive and active modes of operation of the present invention can be performed alternately allowing the system and operator to take advantage of all modes of the present invention at any time throughout the entire drying cycle.

Figure 5:
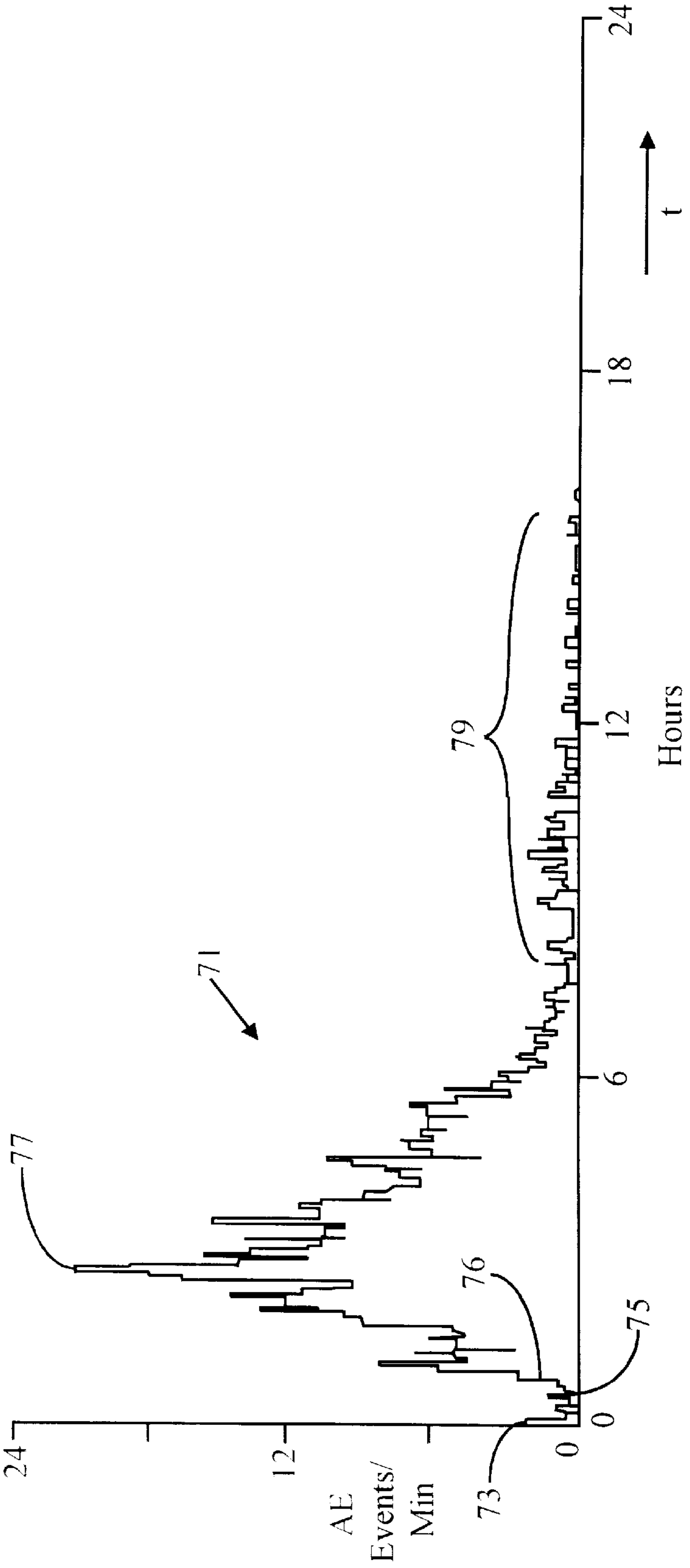
FIG. 5 illustrates a sample AE response curve from the AE monitoring circuit and technique of the present invention.

FIG. 5 is a typical AE events curve 71 versus time that is encountered in high temperature drying of lumber in a kiln, regardless of the species or type of wood, with the time line varying depending on the drying schedule and the species, or type, and thickness of wood being dried. The actual curve depicted in FIG. 5 is for high temperature drying of western hemlock in a kiln which was experimentally determined using the special sticker of the present invention in the passive mode described above. AE events curve 71 reflects the nominal behavior of AE during high temperature drying of lumber of any species, or type, of wood. From initial pulse 73 it can be seen that there is initially a high rate of AE events very early in the drying process which probably results from a combination of variables (e.g., thermal expansion of the wood and stickers). That initial pulse 73 is then followed by a quiescent period 75 of perhaps 0.5 to 1.0 hours in duration with only a minimal number of AE events being recorded. Following quiescent period 75, the number of AE events ramps up at a substantially uniform rate and continues to a major AE peak 77 that coincides with the remaining moisture content in the lumber being near the fiber saturation point of the wood, where stresses also tend to reach their peak. Typical drying times in a kiln for softwoods range from about 12 hours to perhaps 7 days, whereas for hardwoods the range of times is more typically 7 to 60 days.

Since the events in the wood that create the acoustic emission are the result of the release of stress, that stress release must be managed to minimize the degradation of the lumber (e.g., surface and internal checks and warping that affect the appearance of the lumber and thus its grade and value) from the release of those stresses while at the same time minimizing the overall drying time as much as possible (i.e., maximizing the drying rate in those portions of the drying cycle where possible). To achieve that result, the drying rate could be accelerated (e.g., increase the temperature and/or reduce the relative humidity in the kiln) during quiescent period 75 where there are few AE events until there is a major increase in the AE event rate (e.g., at point 76). Then, at point 76, the drying rate could be reduced until peak 77 has been passed, with the drying rate again increased until a desired point in time within the second quiescent period 79. Experience with various species and thickness of wood allows correlation of AE events peak 77 with the remaining moisture content of the wood to assist in the prediction of a desired drying endpoint during period 79.

This technique has two advantages: after drying and less degrade of the lumber. Obviously, the schedule could be adjusted to be more or less conservative for either drying time or degrade to suit the market and end product of the lumber.

During the first quiescent period 75, following the occurrence of the initial AE events shown by pulse 73, the threshold of the sensor is adjusted to obtain maximum sensitivity to AE.

In a passive control strategy, as the AE events increase following point 76 to the main peak 77, the increase of the rate of occurrence of those events can be tracked to determine a maximum rate of occurrence of those events during that period leading up to peak 77. At a predetermined point in time following the maximum event rate being reached, the operation schedule of the kiln is adjusted either manually or automatically to sustain that maximum AE event rate at a predetermined level or within a predetermined range of events until peak 77 is past. Following the occurrence of peak 77, the drying schedule can be adjusted arbitrarily since no significant degradation of the marketability of the lumber will occur.

The advantage of the special sticker is that the special sticker acts as a waveguide and couples the AE from all of the boards in two courses within the stack to a single transducer coupled to the body of the special sticker. Also, the mass of the stack, although relatively low, is sufficient for good coupling contact of the special sticker with the boards, particularly when the special sticker is placed lower in the stack. This approach thus greatly reduces the number of transducer outputs needed to monitor the drying of the stack by integrating the AE from many boards into a single transducer attached to the end of the special sticker.

As an operational enhancement of the passive mode of the present invention, the optional special sticker discussed in relation to FIG. 3B, having a piezoelectric transducer coupled at opposite ends, can be used to determine the location of the sites of individual AE events across the load. In order to do so the transit time from one end of the special sticker to the other must be determined. One way that this can be done is by applying an excitation signal of desired frequency at one end and receiving that excitation signal at the second end, and then subtracting the arrival time of the signal at the second end from the transmission time at the first end. Then to determine the location across the stack of individual AE events, the transducers at both ends of the special sticker are used in the passive mode (i.e., they each simply listen) to detect AE, with the electronics determining the arrival times of an AE event at each of the transducers, then using the difference between the arrival times at each transducer, the predetermined transit time from end-to-end of the special sticker and knowing the length of the special sticker, the location of the occurrence of individual AE events can be determined by linear interpolation. That is, by noting which end of the special sticker the first signal is received from; determining the difference in transit times between both ends of the special sticker by subtracting the arrival time of the first received signal from that of the second received signal, that time difference corresponds directly with the additional distance that the signal had to travel to the second transducer versus the first transducer and that distance is also twice the distance that the point of occurrence of the AE event is from the center of the special sticker; to determine the point of occurrence of the AE event as measured from the center of the special sticker, he ratio of that one half of the time difference with the earlier determined transit time from one end of the special sticker is multiplied by the known length of the special sticker. To determine the distance of the AE event occurrence from each of the two ends of the special sticker, that distance from the center toward the end of the special sticker that first received the signal is subtracted from one half the length of the special sticker to determine the position from the end that first received the signal, and thus the distance from the second end of the special sticker is that distance subtracted from the full length of the special sticker. There are other algorithms that might be used to reach the same conclusion which will be obvious from the above discussion.

In the active, acousto-ultrasonic mode of the present invention, two special stickers 39 are needed in the same stack; one on each side of the same course and in direct vertical alignment with each other, e.g., special stickers 10 and 10' in FIG. 2. In this mode special stickers 10 and 10' perform double duty. First, one or both of special stickers 10 and 10' is/are used passively to monitor the AE events occurring in the stack with that monitoring occurring between the application of ultrasonic pulses to the lumber as discussed below. In the active mode, with special stickers 10 and 10' so positioned in the stack, the moisture content of the wood between sticker 10 and 10' can be determined. This is done by pulsing piezoelectric transducer 47 in special sticker 10, thus applying an ultrasonic wave to sticker 10 with oscillator 64 (FIG. 4), in turn, that ultrasonic wave is transmitted through the lumber in the course to adjacent sticker 10' where the corresponding piezoelectric transducer 47 in sticker 10' receives the response of the lumber in the course to the applied ultrasonic wave. That response signal is then processed by channel electronics $\mathbf{60}^{X}$ and data processor 61 to determine the moisture content of the lumber at that time. The moisture content can be determined from the known relationship between sound velocity and moisture content, or by using other signal parameters (e.g., time centroid, frequency centroid) with or without velocity information.

Typically, measurements of moisture content would be made after the AE response (see FIG. 5) reaches region 79, more likely in the last several hours of the drying process to monitor the rate of the decline of the moisture content to be used to control the drying endpoint. Additionally, the moisture content can by associated in time with the detected of AE events to adjust the drying schedule either manually by the operator, or automatically by the control electronics. However, if one wished to do so, this technique could be used to determine moisture content of the lumber at any time in the drying process, even before the stack is placed in the kiln, perhaps to determine an appropriate drying schedule for a type or species of wood with which the mill has not previously had experience.

Several techniques for determining the coupling integrity between the sensor are well known in the art and can also be used with the special stickers. One means of accomplishing the determination of the integrity of coupling between the special sticker and the stack is to determine the level of energy transmitted from and to the special sticker. This can be done by monitoring the RMS voltage level of the waveform which is sensitive to coupling, where a low RMS voltage indicates poor coupling. A reference that describes techniques for determining coupling integrity is Beall, F. C., J. M. Biemacki and R. L. Lemaster, "the Use of Acousto-Ultrasonics to Detect Biodeterioration in Utility Poles", J. Acoustic Emission, 12 (½): 55–64, 1994.

Similarly, there are several techniques known in the art for determining moisture content in wood. For example, one or more ultrasonic waveform parameters can be assessed to determine the moisture content of the lumber. It is well known that the velocity of ultrasonic waves through wood decrease as the moisture content increases. Additionally, it is known that the sensitivity of determination of the moisture content can be enhanced by examining rations and combinations of a number of ultrasonic waveform parameters, such as time centroid, frequency centroid, signal velocity and RMS voltage level of the transmitted and received ultrasonic signals. One reference that explains this technique is Beall, F. C., M. Titta and J. M. Biemacki, "The Use of Acousto-Ultrasonics to Detect Biodeterioration in Structural Wooden Members", Proc. Nondestructive Testing and Evaluation of Infrastructure, Vol. 2 (H. Dos Reis and B. B. Djordjevic, eds.), Topics on Nondestructive Evaluation Series, American Soc. For Nondestructive Testing, Columbus, Ohio, pp 181–206, 1998.

Two other techniques for determining additional information about the load, condition of the wood and the drying end point are facilitated by the use of the special sticker of the present invention. One is a pulse-echo technique that can be used to determine the moisture content of the wood and to assess the contact integrity between the wood and the special sticker. The second is a feed-forward technique to predict an endpoint of the drying schedule.

In the pulse technique a single piezoeletric transducer 47 at one end of a special sticker 39 is used as a transceiver. Initially an ultrasonic pulse from ultrasonic oscillator 64 (FIG. 4) is applied to piezoelectric transducer 47 and then the same piezoelectric transducer 47 waits for receipt of a reflected ultrasonic return signal. The timing of both the transmitted and received signals is noted, as well as the characteristics of both signals by the electronics. From that information, and at that point in the drying cycle, the moisture content of the wood and the contact integrity between the wood and the special sticker can be determined in a manner similar to that discussed above for the active, acousto-ultrasonic mode.

Another technique is a feed-forward technique that can be used to predict the endpoint of the drying cycle. The endpoint of the drying cycle can be predicted with some accuracy from the rate of change of the AE output following peak 77 (see FIG. 5) even though the actual endpoint occurs in quiescent period 79. The rate of change of the number of AE events can be determined by data processor 61 (see FIG. 4) from the actual number of AE events at a previous selected number of AE samples provided by piezoelecric transducer 47 in special sticker 39 for each stack of lumber. The method to determine the endpoint begins with initially establishing a relationship between the acoustic emission and moisture content of the lumber during the drying cycle following the occurrence of peak 77 and during period 79 for the particular material being dried, and then using that relationship as the master AE curve to predict the time when the endpoint moisture content is expected to be reached.

As mentioned above, the drying end point can be determined by either a passive or an active method, or both. Th the passive method, the rate of acoustic emission (and any other parameter, such as event duration and peak amplitude) is tracked from some reference point. For example, the time at the peak rate of acoustic emission as determined from previous experience with the same species of wood. The time from the peak to the end point determination in previous drying runs thus serves as a nominal time to end point. This can be fine tuned by monitoring the acoustic emission characteristics over this time period to arrive at an acceptable algorithm.

In the active method, the changes in moisture content is determined over a like period of time (from the peak acoustic emission rate), and the drying run terminated when the desired moisture content is reached.

In the combined passive and active method, both the acoustic emission parameters and moisture content are tracked and the information is analyzed to reach the desired end point using one of the methods as the supervisory input, and the other to modify the predicted end point by increasing or decreasing the drying time. Other techniques could also be used, such as averaging the two predicted end points, or using some other weighting of the methods.

While in the above discussion the wooden sticker and special sticker have both been described as having the same rectangular cross-section, it is not necessary that the special sticker have a rectangular cross-section even if the wooden stickers do. For example the special sticker could have a square cross-section with the length of one of the sides of that square having substantially the same length as the height of the wooden sticker as oriented in the stack. Similarly the special sticker could have a cross-section that is any parallelogram so long as the height is substantially the same as the height of a wooden sticker when in place in the stack. Of course it is not necessary that the cross-section of the special sticker be limited to a parallelogram, the cross-section could be circular with the diameter of the cycle being substantially the same as the height of the wooden sticker when in place in the stack. Similarly, the cross-section of the special sticker could be elliptical with the length of the smaller axis being substantially the same as the height of a wooden sticker when in place in the stack. In fact the cross-section of the special sticker could have any shape, even a non-symmetric shape, or circular with flat sides, a hexagon, etc. In fact, in some situations, one might consider using a special sticker where the area of contact between the lumber and the special sticker is smaller to increase the coupling pressure on the special sticker, which also provides a secondary advantage in that there will also be a decrease in the retarded drying rate at the special sticker contact areas.

While what has been discussed above, and shown in the figures represent the best mode of the various embodiments known at the time of filing of the patent application, it is not the intent that the present invention be limited to only what has been discussed above, nor to the specific materials or electronic components mentioned above. Rather, the extent of the invention protected hereby extends to equivalents of the various embodiments and thus is limited only by the extent of the claims.

What is claimed is:

1. A special sticker for use in a stack of lumber during drying of that lumber arranged in multiple courses stacked one on top of the other with multiple wooden stickers substantially evenly spaced from each other between courses and extending across the full width of said stack, each wooden sticker having substantially the same vertical, horizontal and length dimensions wherein said length dimension is substantially the same as said full width of said stack, with said wooden stickers installed in said stack with the same vertical-horizontal orientation as each other, said special sticker for inclusion in place of one of said wooden stickers, said special sticker comprising:

a body portion of an acoustically conductive material having a cross-section with a dimension of said cross-section being substantially the same as said vertical dimension of said wooden sticker; and an acoustic sensor attached at one end of said body portion;

wherein the combined length of said body portion and said acoustic sensor is substantially the same as the length of said wooden sticker.

2. A special sticker as in claim 1 wherein said body portion is a metal.

3. A special sticker as in claim 2 wherein said metal is aluminum.

4. A special sticker as in claim 1 wherein said body portion is solid.

5. A special sticker as in claim 1 wherein said body portion defines a cavity in one end thereof to enclose said acoustic sensor with said body portion being substantially the same length as said wooden sticker.

6. A special sticker as in claim 1 wherein said body portion is hollow and disposed to endose said acoustic sensor in one end thereof with said body portion being substantially the same length as said wooden sticker.

7. A special sticker as in claim 1 wherein said acoustic sensor includes a modular housing having a first end and a second end and cross-sectional dimensions that are substantially the same as cross-sectional dimensions as said body portion, with said first end attached to a first end of said body portion with said cross-sectional dimensions of said body portion and said modular housing substantially aligned with each other, and with the combined length of said body portion and said modular housing being substantially the same length as said wooden sticker.

8. A special sticker as in claim 1 wherein said acoustic sensor includes an acoustic transducer mounted in dose physical communication with said body portion.

9. A special sticker as in claim 8 wherein said acoustic sensor further includes:

a preamp/filter electrically connected to said acoustic transducer; and a cable connector electrically connected to said preamp/filter and extending outward from said special sticker.

10. A special sticker as in claim 8 wherein said acoustic sensor further includes:

a preamp/filter electrically connected to said acoustic transducer;

a low power rf transceiver electrically connected to said preamp/filter; and an antenna connected electrically to said low power rf transceiver and extending outward from said special sticker.

11. A special sticker, having a first end and a second end, for use in a stack of lumber during drying of that lumber arranged in multiple courses stacked one on top of the other with multiple wooden stickers substantially evenly spaced from each other between courses and extending across the full width of said stack, each wooden sticker having substantially the same vertical, horizontal and length dimensions wherein said length dimension is substantially the same as said full width of said stack, with said wooden stickers installed in said stack with the same vertical-horizontal orientation as each other, said special sticker for inclusion in place of one of said wooden stickers, said special sticker comprising:

a body portion of an acoustically conductive material having a cross-section with a dimension of said cross-section being substantially the same as said vertical dimension of said wooden sticker, and having a first end and a second end;

a first acoustic sensor attached at said first end of said body portion; and a second acoustic sensor attached at said second end of said body portion;

wherein the combined length of said body portion and said first and second acoustic sensors is substantially the same as the length of said wooden sticker.

12. A special sticker as in claim 11 wherein said body portion is a metal.

13. A special sticker as in claim 12 wherein said body portion is aluminum.

14. A special sticker as in claim 11 wherein said body portion is solid.

15. A special sticker as in claim 11 wherein said body portion defines a first cavity in said first end thereof to enclose said first acoustic sensor and a second cavity in said second end thereof to enclose said second acoustic sensor with said body portion being substantially the same length as said wooden sticker.

16. A special sticker as in claim 11 wherein said body portion is hollow, and disposed to enclose said first acoustic sensor in said first end of said body portion and said second acoustic sensor in said second end of said body portion, with said body portion being substantially the same length as said wooden sticker.

17. A special sticker as in claim 11 wherein:

said first acoustic sensor includes a first modular housing having a first end and a second end and cross-sectional dimensions that are substantially the same as cross-sectional dimensions as said body portion, with said first end attached to said first end of said body portion; and said second acoustic sensor includes a second modular housing having a first end and a second end and cross-sectional dimensions that are substantially the same as cross-sectional dimensions as said body portion, with said first end attached to said second end of said body portion;

with said cross-sectional dimensions of said body portion and each of said first and second modular housings substantially aligned with each other, and with the combined length of said body portion and said first and second modular housings being substantially the same length as said wooden sticker.

18. A special sticker as in claim 11 wherein:

said first acoustic sensor includes a first acoustic transducer mounted in close physical communication with said first end of said body portion; and said second acoustic sensor includes a second acoustic transducer mounted in close physical communication with said second end of said body portion.

19. A special sticker as in claim 18 wherein:

said first acoustic sensor further includes:

a first preamp/filter electrically connected to said first acoustic transducer; and a first cable connector electrically connected to said first preamp/filter and extending outward from said first end of said special sticker; and said second acoustic sensor further includes:

a second preamp/filter electrically connected to said second acoustic transducer; and a second cable connector electrically connected to said second preamp/filter and extending outward from said second end of said special sticker.

20. A special sticker as in claim 18 wherein:

said first acoustic sensor further includes:

a first preamp/filter eclectically connected to said first acoustic transducer;

a first low power rf transceiver electrically connected to said first preamp/filter; and a first antenna connected electrically to said first low power rf transceiver and extending outward from said first end of said special sticker; and said second acoustic sensor further includes:

a second preamp/filter electrically connected to said second acoustic transducer;

a second low power rf transceiver electrically connected to said second preamp/filter; and a second antenna connected electrically to said second low power rf transceiver and extending outward from said second end of said special sticker;

wherein said first and second rf transceivers operate at different frequencies.

21. A special sticker as in claim 8 wherein said acoustic transducer includes a piezoelectric transducer.

22. A special sticker as in claim 18 wherein:

said first acoustic transducer includes a first piezoelectric transducer; and said second acoustic transducer includes a second piezoelectric transducer.

23. A special sticker as in claim 1 wherein said cross-section of said body portion is a square with a dimension of each side of said square being substantially the same as said vertical dimension of said wooden sticker.

24. A special sticker as in claim 1 wherein said cross-section of said body portion is a rectangle with one dimension of a side of said rectangle being substantially the same as said vertical dimension of said wooden sticker.

25. A special sticker as in claim 1 wherein said cross-section of said body portion is a circle with a diameter being substantially the same as said vertical dimension of said wooden sticker.

26. A special sticker as in claim 1 wherein said cross-section of said body portion is an ellipse with the length of one of the major and minor dimensions being substantially the same as said vertical dimension of said wooden sticker.

27. A special sticker as in claim 11 wherein said cross-section of said body portion is a square with a dimension of each side of said square being substantially the same as said vertical dimension of said wooden sticker.

28. A special sticker as in claim 11 wherein said cross-section of said body portion is a rectangle with one dimension of a side of said rectangle being substantially the same as said vertical dimension of said wooden sticker.

29. A special sticker as in claim 11 wherein said cross-section of said body portion is a circle with a diameter being substantially the same as said vertical dimension of said wooden sticker.

30. A special sticker as in claim 11 wherein said cross-section of said body portion is an ellipse with the length of one of the major and minor dimensions being substantially the same as said vertical dimension of said wooden sticker.

31. A monitoring system for use in the drying of lumber in a kiln with said lumber arranged in multiple courses stacked one on top of the other with multiple wooden stickers substantially evenly spaced from each other between courses and extending across the full width of said stack, each wooden sticker having substantially the same vertical, horizontal and length dimensions wherein said length dimension is substantially the same as said full width of said stack, with said wooden stickers installed in said stack with the same vertical-horizontal orientation as each other, said monitoring system comprising:

a special sticker for inclusion in place of one of said wooden stickers in said stack of lumber extending the full width of said stack and in contact with substantially all boards within the courses above and below said special sticker, said special sticker comprising:

a body portion of an acoustically conductive material having a cross-section with a dimension of said cross-section being substantially the same as said vertical dimension of said wooden sticker to transmit acoustical emission from said boards across said stack through said body portion; and an acoustic transducer attached at one end of said body portion to detected acoustical emission transmitted through said body portion and generate a corresponding acoustic emission signal thereto;

wherein the combined length of said body portion and said acoustic transducer is substantially the same as the length of a wooden sticker; and signal processing and control electronics coupled to receive said acoustic emission signal from said acoustic transducer to monitor and control the drying of said lumber within said kiln.

32. A monitoring system as in claim 31 wherein said acoustic transducer is a piezoeelectric transducer.

33. A monitoring system as in claim 31 further including an electronic cable connected between said acoustic transducer of said special sticker and said signal processing and control electronics.

34. A monitoring system as in claim 31 wherein:

said special sticker further includes a first low power rf transceiver connected to said acoustic transducer; and said signal processing and control electronics further includes a second low power rf transceiver to receive and transmit, via radio waves, signals from and to said first low power rf transceiver of said special sticker.

35. A monitoring system as in claim 31 wherein said signal processing and control electronics further includes:

a data processor to receive said acoustic emission signal and to determine therefrom information relative to the drying of the lumber; and a controller coupled to said data processor to control the drying operation of said kiln in response to information relative to the drying of the lumber developed by said data processor.

36. A monitoring system for use in the drying of lumber in a kiln with said lumber arranged in multiple courses stacked one on top of the other with multiple wooden stickers substantially evenly spaced from each other between courses and extending across the full width of said stack, each wooden sticker having substantially the same vertical, horizontal and length dimensions wherein said length dimension is substantially the same as said full width of said stack, with said wooden stickers installed in said stack with the same vertical-horizontal orientation as each other, said monitoring system comprising:

a first special sticker for inclusion in place of a first of said wooden stickers in said stack of lumber extending the full width of said stack and in contact with substantially all boards within the courses above and below said first special sticker, said first special sticker comprising:

a first body portion of an acoustically conductive material having a cross-section with a dimension of said cross-section being substantially the same as said vertical dimension of said wooden sticker to transmit acoustical emission from said boards across said stack through said first body portion and to deliver a first acousto-ultrasonic vibration to said boards to which said first body portion is in contact; and a first acoustic transducer attached at one end of said first body portion to detected acoustical emission transmitted through said first body portion and generate a corresponding acoustic emission signal thereto, and to deliver a first acousto-ultrasonic vibration to said first body portion in response to an externally applied ultrasonic electrical signal;

wherein the combined length of said first body portion and said first acoustic transducer is substantially the same as the length of a wooden sticker;

a second special sticker for inclusion in place of a second of said wooden stickers in said stack of lumber extending the full width of said stack with said second special sticker in vertical alignment with said first special sticker and in contact with substantially all boards within one of the courses above or below said first special sticker, said second special sticker comprising:

a second body portion of an acoustically conductive material having a cross-section with a dimension of said cross-section being substantially the same as said vertical dimension of said wooden sticker to receive a second acousto-ultrasonic vibration from said boards to which said first body portion of said first special sticker delivered said first acousto-ultrasonic vibration; and a second acoustic transducer attached at one end of said second body portion to detected said second acousto-ultrasonic vibration from said second body portion and to generate a corresponding acousto-ultrasonic signal thereto;

wherein the combined length of said second body portion and said second acoustic transducer is substantially the same as the length of a wooden sticker; and a signal processing and control electronics coupled to receive said acoustic emission signal from said first acoustic transducer, to generate and apply an acousto-ultrasonic signal to said first acoustic transducer, and to receive said corresponding acousto-ultrasonic signal from said second acoustic transducer for monitoring and controlling the drying of said lumber within said kiln.

37. A monitoring system as in claim 36 further including:

a first electronic cable connected between said first acoustic transducer of said first special sticker and said signal processing and control electronics; and a second electronic cable connected between said second acoustic transducer of said second special sticker and said signal processing and control electronics.

38. A monitoring system as in claim 36 wherein:

said first special sticker further includes:

a first low power rf transceiver connected to said first acoustic transducer; and a first antenna connected electrically to said first low power rf transceiver and extending outward from said first end of said first special sticker;

said second special sticker further includes:

a second low power rf transceiver connected to said second acoustic transducer; and a second antenna connected electrically to said second low power rf transceiver and extending outward from said first end of said second special sticker; and said signal processing and control electronics includes:

a third low power rf transceiver;

a third antenna connected electrically to said third low power rf transceiver to receive and transmit, via radio waves, signals from and to said first antenna of said first special sticker;

a fourth low power rf transceiver; and a fourth antenna connected electrically to said fourth low power rf transceiver to receive and transmit, via radio waves, signals from and to said second antenna of said second special sticker.

39. A monitoring system as in claim 36 wherein said signal processing and control electronics further includes:

a first signal conditioning channel coupled to said first acoustic transducer of said first special sticker to receive said acoustic emission signal therefrom;

a second signal conditioning channel coupled to said second acoustic transceiver of said second special sticker to receive said acousto-ultrasonic signal therefrom;

an ultrasonic oscillator to generate and apply said ultrasonic electrical signal to said first acoustic transducer of said first special sticker;

a data processor to receive said acoustic emission signal and said acousto-ultrasonic signal from said first and second conditioning channels, and said ultrasonic electrical signal from said ultrasonic oscillator to determine therefrom information relative to the drying of the lumber; and a controller coupled to said data processor to control the drying operation of said kiln in response to information relative to the drying of the lumber developed by said data processor.

40. A monitoring system as in claim 36 wherein said signal processing and control electronics alternates between processing said acoustic emission signal from said first acoustic transducer, and generating said acousto-ultrasonic signal and processing said corresponding acousto-ultrasonic signal from said second acoustic transducer.

41. A monitoring system for use in the drying of lumber in a kiln with said lumber arranged in multiple courses stacked one on top of the other with multiple wooden stickers substantially evenly spaced from each other between courses and extending across the full width of said stack, each wooden sticker having substantially the same vertical, horizontal and length dimensions wherein said length dimension is substantially the same as said full width of said stack, with said wooden stickers installed in said stack with the same vertical-horizontal orientation as each other, said monitoring system comprising:

a special sticker having a first end and a second end, said special sticker for inclusion in place of a wooden sticker in said stack of lumber extending the full width of said stack and in contact with substantially all boards within the courses above and below said special sticker, said special sticker comprising:

a body portion of an acoustically conductive material having substantially the same height and width as a wooden sticker to transmit acoustical emission from said boards across said stack through said body portion;

a first acoustic transducer attached to said first end of said body portion to detected acoustical emission transmitted through said body portion and generate a corresponding first acoustic emission signal thereto; and a second acoustic transducer attached to said second end of said body portion to detected acoustical emission transmitted through said body portion and generate a corresponding second acoustic emission signal thereto;

wherein the combined length of said body portion and said first and second acoustic transducers is substantially the same as the length of a wooden sticker; and a signal processing and control electronics coupled to receive said first and second acoustic emission signals from said first and second acoustic transducers to determine the point across said stack each acoustic emission occurs.

42. A method for locating acoustic emission across a stack of lumber, said lumber stacked in multiple courses, one on top of the other, with multiple wooden stickers substantially evenly spaced from each other between courses and extending across the full width of said stack, said method comprising the steps of:

a. replacing one of said wooden stickers in said stack with a special sticker of an acoustically conductive material, said special sticker extending through the width of said stack in contact with all boards within the courses above and below said special sticker, said special sticker having a first acoustic transducer coupled to one end of said special sticker and a second acoustic transducer coupled to another end of said special sticker with each of said first and second acoustic transducers producing an electronic signal in response to an acoustic vibration of said special sticker caused by an acoustic emission from said stack of lumber;

b. electronically monitoring, simultaneously and independently, each of said first and second acoustic transducers for an acoustic signal generated in response to the same acoustical emission detected by said special sticker from all boards within the courses above and below said special sticker and transmitted through said special sticker to both ends thereof to said first and second acoustic transducers;

c. determining a time of arrival for each acoustic signal from each of said first and second acoustic transducers; and d. calculating a point across the stack where the acoustic emission occurred from said times of arrival of the acoustic signals from said first and second acoustic transducers using linear interpolation, knowing a transmission time of said special sticker from one end to the other for acoustic waves in the frequency range of acoustic emission from said lumber.

43. A method for locating acoustic emission across a stack of lumber as in claim 42 wherein step d. includes the steps of:

e. determining the difference in transit times between both ends of said special sticker by subtracting the arrival time of a first received signal from that of a second received signal;

f. dividing said difference in transit times in half;

g. dividing the result of step f. by said transmission time of said special sticker from one end to the other for acoustic waves in the frequency range of acoustic emission from said lumber; and h. multiplying the result of step g. by the known length of said special sticker to determine the distance of the location where said acoustic emission occurred from the center of said special sticker in the direction of the end of said special sticker from which the first signal was received.

44. A method for locating acoustic emission across a stack of lumber as in claim 43 further including the steps of:

i. dividing the length of said special sticker by two;

j. subtracting the result of step h. from the result of step i. to determine the position of occurrence of said acoustic emission from the end of the special sticker that first received the signal; and k. subtracting the result of step j. from the length of said special sticker to determine the position of occurrence of said acoustic emission from the second end of the special sticker.

45. A method for measuring properties of lumber over time during drying, said lumber stacked in multiple courses, one on top of the other, with multiple wooden stickers substantially evenly spaced from each other between courses and extending across the full width of said stack, said method comprising the steps of:

a. physically coupling an acousto-ultrasonic transducer to one end of a special sticker of an acoustically conductive material;

b. replacing one of said wooden stickers in said stack with said special sticker, said special sticker extending through the width of said stack substantially in contact with all boards within the courses above and below said special sticker; and c. electronically monitoring said acousto-ultrasonic transducer for an acoustic signal generated in response to acoustical emission from all boards within the courses above and below said special sticker detected by said special sticker over the width of said stack and transmitted through said special sticker to said acousto-ultrasonic transceiver;

d. processing said electronically monitored response from said acousto-ultrasonic transducer of step c. during the drying time of said lumber in said stack; and e. generating an acoustic emission versus time response curve for said stack throughout the drying cycle.

46. A method as in claim 45:

wherein said acoustic emission versus time response curve for wood has a predictable shape for the various species of wood with a first period where the number of acoustic emission initially increasing at a maximum rate related to the species of wood being dried which can be slowed by controlling temperature and humidity conditions of the environment in which said stack is located, with the number of acoustic emission increasing to a peak value at a time that various based on the species of the wood and the drying environment, then in a second period the number of acoustic emission then begins to gradually decrease to a third period that is an end quiescent tailing off period;

wherein said method further includes the steps of:

f. monitoring said acoustic emission versus time response curve for an acoustic emission rate during said first period;

g. controlling said drying environment during said first period to limit said acoustic emission rate during said first period to obtain a desired maximum degrade of the finished lumber; and h. arbitrarily controlling said drying environment during said second and third periods.

47. A method for measuring properties of lumber over time during drying, said lumber stacked in multiple courses, one on top of the other, with multiple wooden stickers substantially evenly spaced from each other between courses and extending across the full width of said stack, said method comprising the steps of:

a. physically coupling an acousto-ultrasonic transducer to one end of a special sticker of an acoustically conductive material;

b. replacing one of said wooden stickers in said stack with said special sticker, said special sucker extending through the width of said stack substantially in contact with all boards within the courses above and below said special sticker;

c. applying an ultrasonic pulse to said acousto-ultrasonic transducer to ultrasonically excite said special sticker;

d. following step c., detecting an ultrasonic response from said special sticker detected by said acousto-ultrasonic transducer and generating an electrical signal corresponding thereto;

e. determining a time delay between steps c. and d. to determine sound velocity through said lumber;

f. comparing said ultrasonic pulse of step c. with said electrical signal generated in step d.; and g. from the results of steps e. and f., determining an end time for said drying cycle, moisture content of said lumber or contact integrity between said special sticker and said lumber using a combination of sound velocity, time centroid and frequency centroid.

48. A method for predicting an end-point of a drying cycle of lumber from acoustic emission therefrom over time using a feed-forward technique, said lumber stacked in multiple courses, one on top of the other, with multiple wooden stickers substantially evenly spaced from each other between courses and extending across the full width of said stack, wherein a typical acoustic emission versus time response curve, and related moisture content for the species of wood has been predetermined and has a shape that has a first period where the number of acoustic emission initially increases at a substantially steady rate related to the species of wood being dried and temperature and humidity conditions of the environment in which said stack is dried, with the number of acoustic emission increasing to a peak value, then in a second period the number of acoustic emission gradually decreases to a third period that is an end quiescent tailing off period, said method comprising the steps of:

a. physically coupling an acousto-ultrasonic transducer to one end of a special sticker of an acoustically conductive material;

b. replacing one of said wooden stickers in said stack with said special sticker, said special sticker extending through the width of said stack substantially in contact with all boards within the courses above and below said special sticker; and c. electronically monitoring said acousto-ultrasonic transducer for an acoustic signal generated in response to acoustical emission from all boards within the courses above and below said special sticker detected by said special sticker over the width of said stack and transmitted through said special sticker to said acousto-ultrasonic transceiver;

d. processing said electronically monitored response from said acousto-ultrasonic transducer of step c. during the drying time of said lumber in said stack;

e. generating an acoustic emission versus time response curve for said stack throughout the drying cycle;

f. comparing the response curve from step e. with said typical acoustic emission versus time response curve; and g. calculating said drying end-point by interpolation using an offset determined in the comparison of step f. with the end-point of said typical acoustic emission versus time response curve.

49. A method for measuring properties of lumber over time during drying, said lumber stacked in multiple courses, one on top of the other, with multiple wooden stickers substantially evenly spaced from each other between courses and extending across the full width of said stack, said method comprising the steps of:

a. physically coupling a first acousto-ultrasonic transducer to one end of a first special sticker of an acoustically conductive material;

b. replacing one of said wooden stickers in said stack with said first special sticker, said first special sticker extending through the width of said stack substantially in contact with all boards within the courses above and below said first special sticker;

c. physically coupling a second acousto-ultrasonic transducer to one end of a second special sticker of an acoustically conductive material;

d. replacing a second of said wooden stickers in said stack of lumber that is in vertical alignment with said first special sticker and in contact with substantially all boards within one of the courses above or below said first special sticker with said second special sticker extending the full width of said stack; and e. monitoring one of said first and second acousto-ultrasonic transducers for a response the corresponding one of said first and second special stickers.

50. A method claim as in claim 49 wherein step e. includes the step of:

f. monitoring said first acousto-ultrasonic transducer for acoustic emission from said stack of lumber detected by said first special sticker wherein said response is an acoustic emission response curve corresponding to said acoustic emission detected by said first special sticker.

51. A method as in claim 49 wherein:

said method further includes the step of:

f. applying an ultrasonic signal to said first acousto-ultrasonic transducer to impart an ultrasonic vibration to said first special sticker; and step f. includes the step of:

g. monitoring said second acousto-ultrasonic transducer for an ultrasonic signal corresponding to ultrasonic vibrations received by said second special sticker from said course of lumber intermediate said first and second stickers in response to said signal application of step f.

52. A method as in claim 51 wherein said method further includes the step of:

h. comparing said ultrasonic signal applied in step f. to said ultrasonic signal detected in step g.; and i. determining contact integrity between each of said first and second special stickers with course of lumber between them from the result of step h.

53. A method as in claim 50:

wherein an acoustic emission versus time response curve for wood has a predictable shape for each of the various species of wood with a first period during which the number of acoustic emission initially increases at a maximum rate related to the species of wood being dried which can be slowed by controlling temperature and humidity conditions of the environment in which said stack is located, with the number of acoustic emission increasing to a peak value at a time that various based on the species of the wood and the drying environment, then in a second period following said peak the number of acoustic emission then begins to gradually decrease to a third period that is an end quiescent tailing off period;

wherein said method further includes the steps of:

g. applying an ultrasonic signal to said first acousto-ultrasonic transducer to impart an ultrasonic vibration to said first special sticker following in said period of said acoustic emission response curve of step f.; and h. monitoring said second acousto-ultrasonic transducer for an ultrasonic signal corresponding to ultrasonic vibrations received by said second special sticker from said course of lumber intermediate said first and second stickers in response to said signal application of step g;

wherein the pair of steps g. and h. are performed alternately with step f.

54. A method as in claim 53 wherein said method further includes the steps of:

i. determining a time delay between steps g. and h. to determine sound velocity through said lumber;

j. comparing said ultrasonic pulse of step g. with said electrical signal generated in step h.; and k. from the results of steps i. and j., determining an end time for said drying cycle, moisture content of said lumber or contact integrity between said special sticker and said lumber using a combination of sound velocity, time centroid and frequency centroid.

* * * * *